United States Patent
Paster

(10) Patent No.: US 8,413,111 B2
(45) Date of Patent: Apr. 2, 2013

(54) TECHNIQUES FOR DYNAMIC UPDATING AND LOADING OF CUSTOM APPLICATION DETECTORS

(75) Inventor: Steven B. Paster, San Carlos, CA (US)

(73) Assignee: Actiance, Inc., Mountain View, CA (US)

( * ) Notice: Subject to any disclaimer, the term of this patent is extended or adjusted under 35 U.S.C. 154(b) by 814 days.

(21) Appl. No.: 12/568,080

(22) Filed: Sep. 28, 2009

(65) Prior Publication Data

US 2010/0088670 A1    Apr. 8, 2010

Related U.S. Application Data

(60) Provisional application No. 61/103,164, filed on Oct. 6, 2008, provisional application No. 61/102,343, filed on Oct. 2, 2008.

(51) Int. Cl.
*G06F 9/44* (2006.01)
(52) U.S. Cl. ........ 717/106; 717/103; 717/111; 717/117; 709/223; 709/224; 706/47; 706/59
(58) Field of Classification Search .................. None
See application file for complete search history.

(56) References Cited

U.S. PATENT DOCUMENTS

| | | | | |
|---|---|---|---|---|
| 5,619,645 A * | 4/1997 | Montenegro et al. | ........... | 714/48 |
| 6,003,084 A * | 12/1999 | Green et al. | ................... | 709/227 |
| 7,707,401 B2 * | 4/2010 | Miller et al. | ................... | 713/153 |
| 7,809,818 B2 * | 10/2010 | Plamondon | ................... | 709/223 |
| 7,933,221 B1 * | 4/2011 | Pawar et al. | ................... | 370/253 |
| 2004/0030778 A1 * | 2/2004 | Kronenberg et al. | ......... | 709/224 |
| 2009/0006592 A1 * | 1/2009 | Carter | ........................... | 709/223 |
| 2009/0106421 A1 * | 4/2009 | Kronenberg et al. | ......... | 709/224 |
| 2009/0109845 A1 * | 4/2009 | Andreasen et al. | ........... | 370/230 |
| 2010/0083382 A1 * | 4/2010 | Farley et al. | .................... | 726/24 |
| 2010/0154059 A1 * | 6/2010 | McNamee et al. | .............. | 726/23 |
| 2010/0162348 A1 * | 6/2010 | Narayanan et al. | ............... | 726/1 |
| 2011/0213869 A1 * | 9/2011 | Korsunsky et al. | ........... | 709/223 |

OTHER PUBLICATIONS

Title: Comparative association rules mining using Genetic Network Programming(GNP) with attributes accumulation mechanism and its application to traffic systems, author: Wei Wei et al, source: IEEE, dated: Jun. 1, 2008.*

Title: Learning rules for anomaly detection of hostile network traffic, Mahoney, M.V et al, source: IEEE, dated: 2003.*

* cited by examiner

*Primary Examiner* — Chameli Das

(74) *Attorney, Agent, or Firm* — Kilpatrick Townsend & Stockton LLP

(57) ABSTRACT

In various embodiments, a data-driven model is provided for an application detection engine for the detection and identification of network-based applications. In one embodiment, information can be input into an application detection database. The information may include a hostname, ports, transport protocol (TCP/UDP), higher layer protocol (SOCKS, HTTP, SMTP, FTP, etc), or the like. The information may be associated with a given application. The information may be used to create rule sets or custom program logic used by one or more various application detection engines for determining whether network traffic has been initiated by a given application. The information may be dynamically loaded and updated at the application detection engine.

24 Claims, 9 Drawing Sheets

TECHNIQUES FOR DYNAMIC UPDATING AND LOADING OF CUSTOM APPLICATION DETECTORS

CROSS-REFERENCES TO RELATED APPLICATIONS

This Applications claims the benefit of and priority to U.S. Provisional Patent Application No. 61/102,343, filed Oct. 2, 2008, entitled "Application Detection Architecture and Techniques," and U.S. Provisional Patent Application No. 61/103,164, filed Oct. 6, 2008, entitled "Techniques For Dynamic Updating And Loading Of Custom Application Detectors," which are incorporated by reference herein in their entirety for all purposes.

This Application is related to commonly owned copending U.S. patent application Ser. No. 12/568,073, filed Sep. 28, 2009, entitled "Application Detection Architecture and Techniques," which is herein incorporated by reference in its entirety for all purposes.

BACKGROUND OF THE INVENTION

This Application relates generally to systems for managing and processing information, and specifically to an architecture and techniques for managing network-based applications accessed by computer systems and other devices.

With the advent of modern computers and computer networks, users have been provided with a faster electronic means of communicating with each other. Browser applications, such as Internet Explorer from Microsoft Corporation and Firefox from the Mozilla Foundation, can allow users to browse the world-wide web, obtain news information, share photos or music, or the like, through computer networks, such as the Internet. In another example, e-mail and instant messaging can allow users to interact, for example, in real-time communications.

Computer networks can often include hundreds or thousands of network hosts. A network host can be a computer or other hardware device that runs software applications and originates and/or receives network traffic. Network administrators may often be responsible for maintaining these network hosts in proper running order. The network administrators may incorporate a variety of methodologies and devices in an attempt to ensure that any computer network under their supervision operates securely and reliably. To that end, network administrators may often set rules or establish network policies for users, groups, and devices about the types of software applications and network traffic allowed on a network.

Network applications may include software applications on a network host that are responsible for originating and/or receiving network traffic, referred to as network flows. Some network applications may be well-behaved and conform with a network's rules and policies. Other network applications may be poorly-behaved, installing without a user's or network administrator's permission, hiding themselves and their operation, and violating a network's rules and policies. Examples of poorly-behaved network applications may include computer viruses, worms, spyware, and malware applications. Additionally, some more legitimate applications, such as instant messaging applications, file-sharing or other types of peer-to-peer network applications, voice-over IP (VOIP) communication applications, and multimedia applications may be responsible for network flows that can circumvent network policies and jeopardize network security and reliability.

Often, poorly-behaved network applications can attempt to conceal their network flows to avoid detection and disregard network policies. Common evasion techniques may include using non-standard network protocols, dynamic port and channel selection, which limits the effectiveness of monitoring and blocking network ports to control network traffic; HTTP/HTTPS tunneling, which hides network flows in normally-permitted web traffic; Peer-to-Peer onion routing, which selects destination addresses for peer-to-peer routing at random to circumvent destination address blocking; and encryption of network packet data, which prevents network monitors from examining the contents of network packets to identify the type of network flow.

For example, some common peer-to-peer VOIP applications can circumvent network policies in a number of ways. The peer-to-peer VOIP application may dynamically selected different ports and channels for communication. If UDP is blocked, the application can fall back on TCP/IP. Additionally, the peer-to-peer VOIP application may tunnel its data over open ports 80 or 443, which are normally intended for HTTP or SSL traffic. A peer-to-peer VOIP application may dynamically select supernodes in its peer-to-peer network to circumvent destination address detection and blocking. Additionally, data may be encrypted to prevent detection using packet inspection.

Some attempts at controlling network applications generally include monitoring the content, size, and source and destination addresses of network flows as they pass through a gateway or other point in the network. However, due to the above described evasion techniques, these attempts at controlling network applications may have too little information to reliably detect poorly-behaved network applications. Additionally, these attempts at controlling network applications may further have too little information about who initiate an unauthorized network flow.

Accordingly, what is desired is to solve problems relating to managing network-based applications accessed by computer systems and other devices, some of which may be discussed herein. Additionally, what is desired is to reduce drawbacks related to detecting and identifying network-based application that initiate network flows, some of which may be discussed herein.

BRIEF SUMMARY OF THE INVENTION

In various embodiments, a data-driven model is provided for an application detection engine for the detection and identification of network-based applications. In one embodiment, information collected about network-based applications can be input into an application detection database. The information may include information about a network-based application and its behavior, such as a hostname, ports, transport protocol (TCP/UDP), higher layer protocol (SOCKS, HTTP, SMTP, FTP, etc), or the like. Such information may be associated with a given network-based application, a type of network-based application, a class or category of network-based applications, or the like. In various embodiments, information collected about network-based applications and stored in one or more databases may be used to generate data structures, processing logic, or rule sets used by one or more various application detection engines for determining whether network traffic within a computer network has been initiated by a network-based application.

In some embodiments, one or more computer systems can be configured to generating information for detecting network-based applications. Network traffic sent to or received from a network application can be analyzed either manually or automatically to identify one or more data points associated with the network traffic that are characteristic of the network-based application. Information describing the identified one or more data points can be received receiving at least a first computer system in a set of computer systems. The information describing the identified one or more data points can be associated with the network-based application. Information about the network-based application, the information describing the identified one or more data points, and information associating the information describing the identified one or more data points and the network-based application can then be stored in a database.

A set of rules can be generated at least a second computer system in the set of computer systems in response to accessing the database that configure an application detection engine to identify the network-based application from network traffic. Each rule in the set of rules can include information specifying at least one of the one or more identified data points and information specifying one or more conditions when data in the network traffic associated with the at least one of the one or more identified data points satisfies the rule. The set of rules can then be communicated to an application detection device. The application detection functionality of the application detection device can be dynamically updated to support detection of the network-based application based on the communicated set of rules.

In further embodiments, the set of rules may be packaged into a format appropriate for the application detection device. The packaged set of rules may be distributed electronically, such as via download, or physically distributed using information storage media. Analyzing the network traffic sent to or received from the network application may include identifying one or more of a source address, a destination address, a source port, a destination port, one or more header fields, payload data, or combinations thereof. Information about the network-based application may include one or more of a filename, a download location, a URL, a hostname, or a domain name associated with the network-based application.

In still further embodiments, information may be received describing logic for determining information using one or more of the identified one or more data points. The logic then may be associated with the network-based application. The logic and information associating the logic and the network-based application may be stored in the database. In one embodiment, program code may be generated based on the logic. The program code then can be compiled for execution at the application detection device. The program code may be compiled for dynamic loading at the application detection device. The compiled program code may also be communicated to the application detection device. In one embodiment, the application detection functionality of the application detection device may be dynamically updated to support detection of the network-based application based on the communicated set of rules and the compiled program code.

In various embodiments, the information describing the logic may include logic for maintaining stating information across the network traffic. The information describing the logic may include logic for determining one or more hash values or checksum from the network traffic. Dynamic updated of at least the application detection functionality of the application detection device to support detection of the network-based application based on the communicated set of rules may include updated at start-time or during run-time.

In some embodiments, at least one or more user interfaces of the application detection device may be dynamically updated to support displaying of information associated with the network-based application based on the communicated set of rules. At least reporting functionality of the application detection device may be dynamically updated to support reporting of information associated with the network-based application based on the communicated set of rules.

In one embodiment, one or more information storage media or a computer-readable storage medium stores code executable by a processor of a computer system for detecting network-based applications, The computer-readable storage medium can include code for receiving information describing one or more data points, the one or more data points identified in response to an analysis of network traffic sent to or received from a network application to identify a set of data points associated with the network traffic that are characteristic of the network-based application, code for associating the information describing the identified one or more data points with the network-based application, code for storing information about the network-based application, the information describing the identified one or more data points, and information associating the information describing the identified one or more data points and the network-based application in a database, code for generating a set of rules in response to accessing the database that configure an application detection engine to identify the network-based application from network traffic, each rule in the set of rules specifying at least one of the one or more identified data points and one or more conditions when data in the network traffic associated with the at least one of the one or more identified data points satisfies the rule, and code for communicating the set of rules to an application detection device, wherein at least application detection functionality of the application detection device is dynamically updated to support detection of the network-based application based on the communicated set of rules.

In one embodiment, a system for detecting network-based applications can include a database configured to store information about a network-based application. The system may also include a first set of one or more computer systems configured to receive information describing the one or more data points, the one or more data points determined in response to an analysis of network traffic sent to or received from the network application to identify a set of data points associated with the network traffic that are characteristic of the network-based application, associate the information describing the identified one or more data points with the network-based application, and store the information about the network-based application, the information describing the identified one or more data points, and information associating the information describing the identified one or more data points and the network-based application in the database. The system may further include a second set of one or more computer systems configured to generate a set of rules in response to accessing the database that configure an application detection engine to identify the network-based application from network traffic, each rule in the set of rules specifying at least one of the one or more identified data points and one or more conditions when data in the network traffic associated with the at least one of the one or more identified data points satisfies the rule, and communicate the set of rules to an application detection device, wherein at least application detection functionality of the application detection device is dynamically updated to support detection of the network-based application based on the communicated set of rules.

A further understanding of the nature of and equivalents to the subject matter of this disclosure (as wells as any inherent or express advantages and improvements provided) should be realized by reference to the remaining portions of this disclosure, any accompanying drawings, and the claims in addition to the above section.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Figure 1:
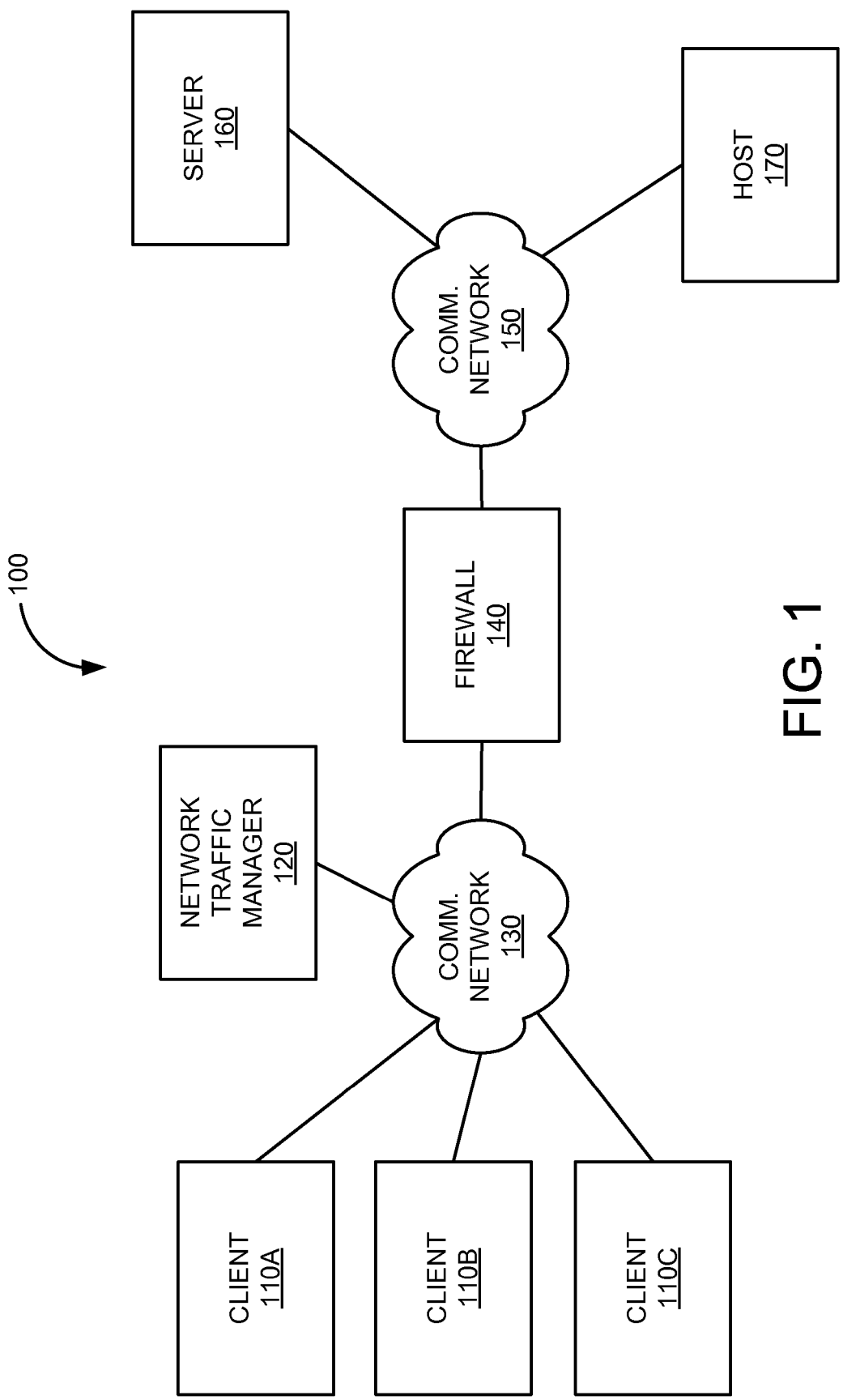
FIG. 1 is a block diagram of a system for detecting and identifying applications that initiate network traffic in one embodiment according to the present invention.

In various embodiments, a data-driven model is provided for an application detection engine for the detection and identification of network-based applications. In one embodiment, information collected about network-based applications can be input into an application detection database. The information may include information about a network-based application and its behavior, such as a hostname, ports, transport protocol (TCP/UDP), higher layer protocol (SOCKS, HTTP, SMTP, FTP, etc), or the like. Such information may be associated with a given network-based application, a type of network-based application, a class or category of network-based applications, or the like. In various embodiments, information collected about network-based applications may be used to generate data structures, processing logic, or rule sets used by one or more various application detection engines for determining whether network traffic within a computer network has been initiated by a network-based application.

In some embodiments, periodically, or upon demand, an application detection database storing information collected about network-based applications can be accessed to generate data structures, processing logic, or rule sets that configure single and multiple inspection point application detection engines. The structures, processing logic, or rule sets can be packaged into one or more filter updates which can be distributed using a communications network to network traffic managers configured as application detection devices. The one or more filter updates can include structures, processing logic, or rule sets, as well as dynamic libraries and application meta-information.

In further embodiments, information collected about network-based applications may be used to generate application-specific segments of code usable by an application detection engine. A customized segment of code, referred to as a custom dissector, can be compiled as a dynamically loadable library (e.g., a 'C' library) that can be installed and loaded by an application detection engine. A custom dissector also may be uninstalled, altered, and reinstalled without relinking or recompiling a main program of an application detection engine.

In some embodiments, a network traffic manager configured as an application detection device may not have prior a priori awareness of a set of given detectable applications that:
may be displayed or otherwise made accessible to a user, used in a "dashboard," or appear in the output of reports;
for which the application detection device can gather "use" statistics;
can in fact be detected, blocked or in some other manner, managed by the application detection device;
are associated with any of one or more categories to which a given detectable application belongs; or
are association with any of one or more descriptions of a given detectable application that may be shown to the user or provided for reporting purposes.

Therefore, in some embodiments, a network traffic manager configured as an application detection device may be periodically updated with custom dissector dynamic libraries. An application detection device may contain a routine, when called by a bootstrapping process of a main program of the application detection device, that contains information making the main program "aware" of various dynamically loadable libraries for custom dissectors and when to call upon a given custom dissector to perform the application or protocol detection attributed to the custom dissector. In a further embodiment, the dynamic aspect of the application management can also extend to graphical user interface (GUI) components, reporting components, or the like, of an application detection device.

One or more examples of aspects and environments in which the various disclosed techniques for dynamic updating and loading of custom application dissectors will now be provided.

In various embodiments, techniques are provided for detecting and identifying applications that initiate network flows. In one embodiment, a layered approach to application detection provides scalability and speed, while further providing quick assessments that move from simplest to complex for rapid detection. For example, in a 1st Tier of single inspection point (SIP) engines, a series or sequence of one or more inspection engines are utilized that provide a single look analysis at a network flow, such as for information from a single packet, a URL, hostname, IP, or the like. In a 2nd Tier of multiple inspection point (MIP) engines, a series or sequence of one or more inspection engines are utilized to generate a correlation between a set of multiple data points in the network flow, such as using string matching, USER-_AGENT, packet number, flow direction, stream offset, connection type, or the like. In a 3rd Tier, custom dissectors can be called from the MIP tier or SIP tier for use as a final stage fall through for deep analysis of the network flow. In one embodiment, the 3rd Tier may be used when packet spanning is required to determine the identity of an application that originated the network flow.

In various embodiments, an application detection architecture may incorporate these techniques and well as others that include, two-dimensional hashing, sparsely populated arrays, an integer-oriented approach to string matching, protocol state information maintained in "probes," wide use of shared memory, and dynamic loaded libraries and "filter updates" for scalability, speed, and to offer quick assessments for rapid detection. In some embodiments, as a result, network packets may be thus examined in real-time or substantially in real-time, for example, at 1 Gbit line rates. Accordingly, an application detection architecture may be employed that utilizes techniques that are computationally fast, yet accurate for their purposes.

In further embodiments, an application detection architecture may incorporate the multiple (e.g., three) tiers or processing layers to balance detection accuracy and computational requirements, such as:

A 1st Tier: Rapid quick-hit packet engine that addresses, for example, up to ~60% or more of the application space.

A 2nd Tier: More complex engine that effectively conducts multiple tests that addresses, for example, up to ~35% or more of the application space.

A 3rd Tier: Customized engine for in-depth analysis also capable of packet spanning needed for, for example, up to ~5% or more of the application space.

FIG. 1 is a block diagram of system 100 that may incorporate techniques for detecting and identifying applications that initiate network flows in various embodiments according to the present invention. In this example, system 100 can include a plurality of clients 110 (e.g., client 110A, client 110B, and client 110C), network traffic manager 120, communications network 130, firewall 140, communications network 150, server 160, and host 170.

Clients 110 can include hardware and/or software elements configured for sending and/or receiving network traffic (e.g., network flows). Some examples of clients 100 are any computing devices, such as any computer systems, personal computers (PC), laptops, workstations, network appliances, mainframes, pocket PCs, personal digital assistants (PDAs), smartphones (BLACKBERRY OR IPHONE devices), telephones, cellular phones, pagers, etc, or other systems or devices having programmable processors or logic circuitry. Clients 110 may be embodied as network hosts that include operating systems and software applications that are responsible for originating and/or receiving network flows. In one example, client 110A may host software applications that send instant message (IM) communications that include textual messages. In another example, client 110B may host web-based applications that send application-specific communications that include encrypted or compressed data. In yet another example, client 110C may host software applications that proxy or relay VOIP communications between two or more network hosts.

Network traffic manager 120 can include hardware and/or software elements configured for managing network flows associated with communications network 130. One example of components of network traffic manager 120 is discussed further with respect to FIG. 2. Network traffic manager 120 may be embodied as any computing device, such as clients 110, and may be implemented as a standalone device, a network appliance, a virtual machine, or the like. In some embodiments, network traffic manager 120 may be embodied as a hardware and/or software component of a system offering network services, such as firewall protection, intrusion detection, antivirus/malware detection, host configuration services, domain name services, directory services, file/printer sharing services, or the like.

In some embodiments, network traffic manager 120 may be implemented in a proxy server model, a server model, an event model, or any combination thereof. In a proxy server model, network traffic manager 120 may be situated to be in communication with communications network 130 and configured to act as a proxy or intermediary for communications between clients 110 and hosts coupled to communications networks 130 and 150. Network traffic manager 120 may support one or more communications protocols, such as any kind of open source, commercially available, or reverse engineered proprietary protocols, and proxy mechanisms thereof (e.g., SOCKS, HTTP, HTTPS). In a proxy server model, network traffic manager 120 may intercept network traffic or network flows originating from or destined to clients 110. In one example, client 110A may connect to hosts coupled to communications networks 130 and 150 for communication using network traffic manager 120 by specifying host and port settings of network traffic manager 120 in proxy settings/preferences of client 110A. Network traffic manager 120 may then negotiate connections and communications on behalf of and to client 110A.

In a server model, network traffic manager 120 network traffic manager 120 may be situated to be in communication with communications network 130 and configured to communicate with hosts coupled to communications networks 130 and 150 in a client-server fashion. Network traffic manager 120 may support one or more communications protocols, such as any kind of any kind of open source, commercially available, or reverse engineered proprietary protocols, (e.g., HTTP, HTTPS, FTP, SMTP, POP3, IMAP, IM protocols, SIP, etc.). For example, network traffic manager 120 may communicated with client 110B using a proprietary messaging protocol that is specially defined for use between client 110B and network traffic manager 120.

In an event model, network traffic manager 120 may be situated to be in communication with another system or device (e.g., directly or through communications network 130) and configured to interact with the another system or device based on one or more events generated by the another system or device. In various embodiments, network traffic manager 120 may be coupled directly or indirectly to a router or network appliance deployed in communications network 130. In one example, a router or network appliance may be responsible for sending events to network traffic manager 120 based on an analysis of a network flow. An event may include information indicating an occurrence in network traffic observed by a router or network appliance (e.g., an HTTP GET request, an IM client signed on/off; an IM client sent a text message to another IM client; the presence status of an IM client has changed; or the like). Once receiving an event, network traffic manager 120 may process information sent with the event or access event information from the router or appliance through an interface (typically an application programmer's interface, or API for short). Network traffic manager 120 thus receives events encapsulating various details concerning network traffic flows.

Communications network 130 can include hardware and/or software elements configured for communicating data. Some examples of communications network 130 can include a public network, a private network, an enterprise local area network, an extranet, a wide area network, a metropolitan area network, or the like. In some embodiments, communications network 130 may form an enterprise network that defined by firewall 140. Firewall 140 can include hardware and/or software elements configured for managing communications between communications networks 130 and 150, often to prevent information from leaving communications network 130 or limit exposure to attacks from communications network 150. In these embodiments, any devices behind firewall 140 may be considered part of the enterprise network. Other devices outside of firewall 140 may be considered to be outside of the enterprise network. Accordingly, clients 110 and network traffic manager can be considered part of the enterprise network. Although firewall 140 is shown, it can be understood that firewall 140 may not be included in system 100.

Communications network 150 can include hardware and/or software elements configured for communicating data. Some examples of communications network 150 can include a public network, a private network, an enterprise local area network, an extranet, a wide area network, a metropolitan area network, the Internet, or the like. In some embodiments, communications network 150 may provide network access to one or more servers, hosts, or information sources, such as server 160 or host 170. Server 160 can include hardware and/or software elements configured for providing services to one or more of clients 110. For example, server 160 may include a server computer providing a web server, an application server, an FTP server, a VoIP server, or the like. Host 170 can include hardware and/or software elements configured for communicating with one or more of clients 110. For example, host 170 may include a server computer, network host, or other device providing a peer-to-peer (P2P) program, an instant messaging client or other chat program, a Skype or VOIP endpoint, or the like.

In one example of operation, network traffic monitor 120 may include or form part of an application detection architecture that attempts to detect and identify network-based applications from network traffic or flows. Network traffic monitor 120 may receive network traffic that may have been initiated by or originated from one or more network-based applications. A network-based application can include any software application, application component, plug-in, module, or set of code configured for sending data to a network host through a communications network or any software application, application component, plug-in, module, or set of code configured for receiving data send from a network host through a communications network. Network traffic monitor 120 may employ one or more dissection engines or application detection tests to detect and identify network-based applications from the network traffic. Once an application is identified, network traffic monitor 120 may determine and/or enforce rules, policies, procedures, audits, or the like, based on the detected applications or devices/users/groups associated with the detected application.

Figure 2:
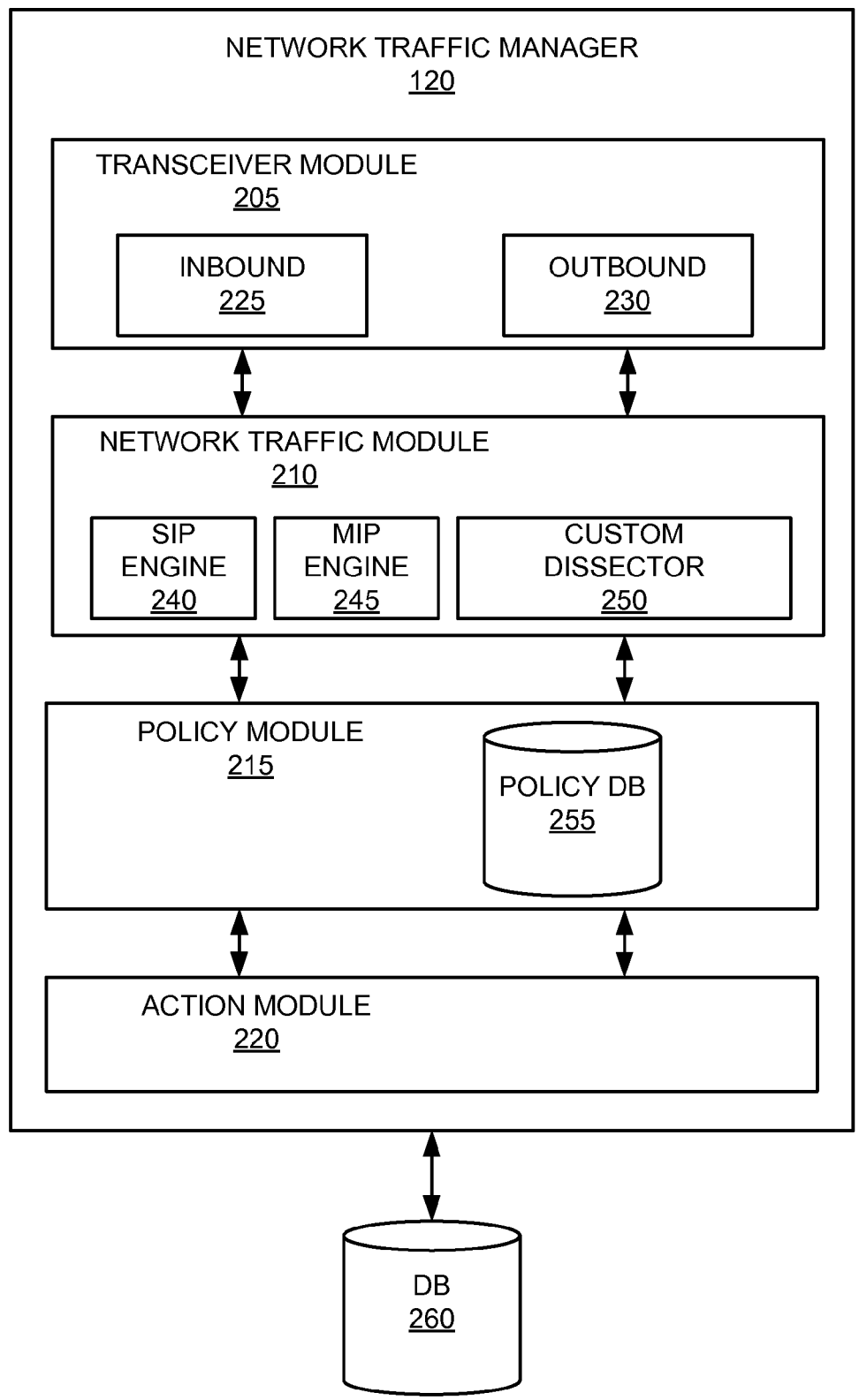
FIG. 2 is a simplified flowchart of a method for detecting and managing network-based applications using a data-driven model in one embodiment according to the present invention.

FIG. 2 is a block diagram of an embodiment of network traffic manager 120 that may be included in system 100 of FIG. 1 in one embodiment according to the present invention. Network manager 120 may be embodied as a single computing device or as multiple computing devices implementing different aspects of the disclosed functionality. In this example, network traffic manager 120 includes transceiver module 205, network traffic module 210, policy module 215, and action module 220.

Transceiver module 205 can include hardware and/or software elements configured for receiving data, such as from communications networks 130 and 150 or directly from another device, and for transmitting data, such as to a host coupled to one of communications networks 130 and 150 or directly to another device. In one embodiment, transceiver module 205 may include inbound transceiver module 225 and outbound transceiver module 230. Inbound transceiver module 225 can include hardware and/or software elements configured for receiving data. Inbound transceiver module 225 may handle network traffic received at one or more communications interfaces (not shown) associated with network traffic manager 120, such as from clients 110 or server 160 of FIG. 1. Outbound transceiver module 230 can includes hardware and/or software elements configured for transmitting data. Outbound transceiver module 230 may handle network traffic generated by or originating from network traffic manager 120 for transmission via one or more communications interfaces (not shown) associated with network traffic manager 120, which may include network traffic generated on behalf of clients 110 or to server 160.

In various embodiments, transceiver module 205 can be communicatively coupled to network traffic module 210. Network traffic module 210 can include hardware and/or software elements configured for analyzing network traffic. In one example, network traffic module 210 may be responsible for identifying an application that produced the network traffic or network flow. In another example, network traffic module 210 may be responsible for identifying users, groups, and/or machines responsible for the network traffic. In other embodiments, network traffic manager may directly or indirectly determine or enforce rules, policies, privileges, or the like, for detected applications.

In some embodiments, network traffic module 210 can receive network flows to be analyzed or data about the network flows to be analyzed from different sources. For example, network traffic monitor 120 may receive network traffic or network flows monitored directly in system 100. In another example, network traffic monitor 120 may receive data about network flows from another device in system 100, such as one or more of clients 110. Network traffic module 210 can collect the information on network flows being sent from or received by network-based applications within system 100. Some examples of the information collected, either directly from network traffic or from other sources can include the source and destination addresses of network packets, the size of network data in network packets, the contents of network packets, the rate of related network packets in a network flow, other attributes of one or more network packets in a network flow, host information, user information, operating system information, or the like.

In various embodiments, network traffic module 210 can use the information on network flows being sent from or received by network-based applications to reliably identify the network flows and any associated network-based applications. Network traffic module 210 may employ a variety of techniques for detecting and identifying a given network-based application. In some embodiments, a layered approach to application detection provides scalability and speed, while further providing quick assessments that move from simplest to complex for rapid detection. For example, in a 1st Tier of single inspection point (SIP) engines, a series or sequence of one or more inspection engines are utilized that provide a single look analysis at a network flow, such as for information from a single packet, a URL, hostname, IP, or the like. In a 2nd Tier of multiple inspection point (MIP) engines, a series or sequence of one or more inspection engines are utilized to generate a correlation between a set of multiple data points in the network flow, such as using string matching, USER-_AGENT, packet number, flow direction, stream offset, connection type, or the like. In a 3rd Tier, custom dissectors can be called from the MIP tier or SIP tier for use as a final stage fall through for deep analysis of the network flow. In one embodiment, the 3rd Tier may be used when packet spanning is required to determine the identity of an application that originated the network flow.

For example, network traffic module 210 may include single inspection point (SIP) engine 240, multi-inspection point (MIP) engine 250, and custom dissector engine 260. SIP engine 240, MIP engine 250, and/or custom dissector 260 may include one or more inspection engines. These inspection engines may be loaded at startup or runtime for network traffic processing and application detection. An inspection engine may be configured by configuration data, such as detection rules that may be dynamically loaded and updated. Some examples of inspection engines that may be employed by SIP engine 240, MIP engine 250, and/or custom dissector 260 can include:

Protocol Parsing Engine—a component that can parse IP and TCP headers to garner information useful later in later detection stages. The engine may attempt to identify session layer protocols as well, such as HTTP, SMTP, HTTPS, FTP, or the like.

IP Address Inspection Engine—a component that can check for IP addresses that have been associated with managed applications. The engine may make identifications based solely on both host IP addresses, but in some embodiments, may also work on a range of IP addresses, such as when supplied with a netmask. The engine may further provide identifications that involve IP addresses combined with port numbers.

Hostname to IP Address conversion—a component that can convert hostnames to IP addresses. Since the association between hostnames and IP addresses can be fluid and may change, the engine may periodically check with the DNS system to retrieve DNS information, such as a hostnames' current IP addresses.

HTTP Hostname Inspection Engine—a component that can examine hostnames in an HTTP header to identify managed HTTP-based protocols.

HTTP URL Inspection Engine—a component that can inspect HTTP URLs to identify managed HTTP-based protocols.

Octet Inspection Engine—a component that can inspect payloads (e.g., TCP or UDP payloads) for recognizable sequences of octets (e.g., strings).

Dynamically Loaded Custom Dissectors—a component that can control or manage a collection of protocol specific detectors. These protocol specific detectors may be loaded dynamically at run-time.

Probe System for tracking historical information. In some embodiments, custom dissectors may include a system for tracking state information that transcends multiple packets. This information can be protocol and custom dissector specific.

SIP engine 240 can include hardware and/or software elements configured for identifying a network-based application from network traffic or a network flow using at least one inspection point. In one example, an inspection point may include at least one data point in network traffic or a network flow, such as an IP address, a URL, a hostname, a domain or domain name, a filename, or the like. SIP engine 240 may be embodied as a single engine configured to perform a series or sequence of SIP tests or as a logical series or sequence of SIP test-specific engines. SIP engine 240 may generate information used to identify a network-based application from the network traffic or network flow and indicators quantifying confidence that the network-based application has been identified. SIP engine 240 may further generate information used to invoke MIP engine 250 or Custom dissector engine 260 for further analysis.

MIP engine 250 can include hardware and/or software elements configured for identifying a network-based application from network traffic or a network flow using one or more inspections points. The one or more inspection points may include multiple data points or combinations of information that represent a data structure, such as a SIP signature, Src/Dest IP:Port, or a combination of information such as packet number, packet length, stream offset, connection type (HTTPS, SOCKS, UNKNOWN, HTTP, HTTP_DIRECT, etc.), packet flow direction, variable string patterns, or the like. MIP engine 250 may be embodied as a single engine configured to perform a series or sequence of MIP tests or as a logical series or sequence of MIP test-specific engines. MIP engine 250 may generate information used to identify a network-based application from the network traffic or network flow and indicators quantifying confidence that the network-based application has been identified. MIP engine 250 may further generate information used to invoke Custom dissector engine 260 for further analysis.

Custom dissector engine 260 can include hardware and/or software elements configure for identifying a network-based application from network traffic or a network flow using application-specific code. The application-specific code can include data structures and/or processing logic that configure Custom dissector engine 260 to more thoroughly analyze the network traffic or network flow. For example, a network-based application may not be readily identified by inspecting individual or multiple data points in packet headers or packet contents. Processing logic associated with application-specific code may be used to compute checksums or maintain state across multiple data points or multiple packets to identify a network-based application.

In various embodiments, network traffic module 210 can be communicatively coupled to and interface with policy module 215. Policy module 215 can include hardware and/or software elements configured for providing and enforcing policies for network traffic or network flows. A policy can include a set of rules, conditions, and actions. A policy may further be associated with one or more users, groups of users, applications, devices, machines, or the like. Policies can be used to block, throttle, accelerate, enhance, or transform network traffic that is part of an identified network flow. In an embodiment, policies for network flows may be enforced by network traffic controlling devices such as switches, routers, firewalls, proxies, IPS, and EPS systems. Network traffic module 210 and policy module 215 can communicate with network traffic controlling devices via any interface or protocol, such as SNMP.

Policy module 215 may be configure to access a number of policies. In one embodiment, policy module 215 may include policy database 255 that stores a set of policies. As shown, policy database 255 is located in policy module 215; however, it will be understood that policy database 255 may be located anywhere in network traffic manager 120 or be separate from network traffic manager 120.

The policies in policy database 255 may include information about actions that can be taken by network traffic monitor 120. The policies may be applied to a packet, group of packets, a network flow, a user, a device, or the like. Policy module 215 may determine from user information, group information, machine information, characteristics related to network flows, or the like whether any policies in policy database 255 applies. Policy module 215 may communicate with network traffic module 210 to enforce policies for detected applications. Once a policy is determined by policy module 215, action module 220 may be configured to perform the action corresponding to the determined policy.

In various embodiments, database 260 may be used to store information usable for network traffic monitor 120. Database 260 may be included in network traffic monitor 120 or be separate from network traffic monitor 120. In one embodiment, database 260 can includes one or more information items including but not limited to: credential information, user information, user to IP address mappings, client identifications for clients 110, policies that may be implemented by policy module 215, or the like. This information is used by modules in network traffic manager 120 for any purpose.

Accordingly, in various embodiments, network traffic manager 120 can detect and identify network-based applications that initiate network flows. A layered approach employed by network traffic manager 120 in some embodiments to application detection can provide scalability and speed, while further providing quick assessments that move from simplest to complex for rapid detection and policy enforcement.

Figure 3:
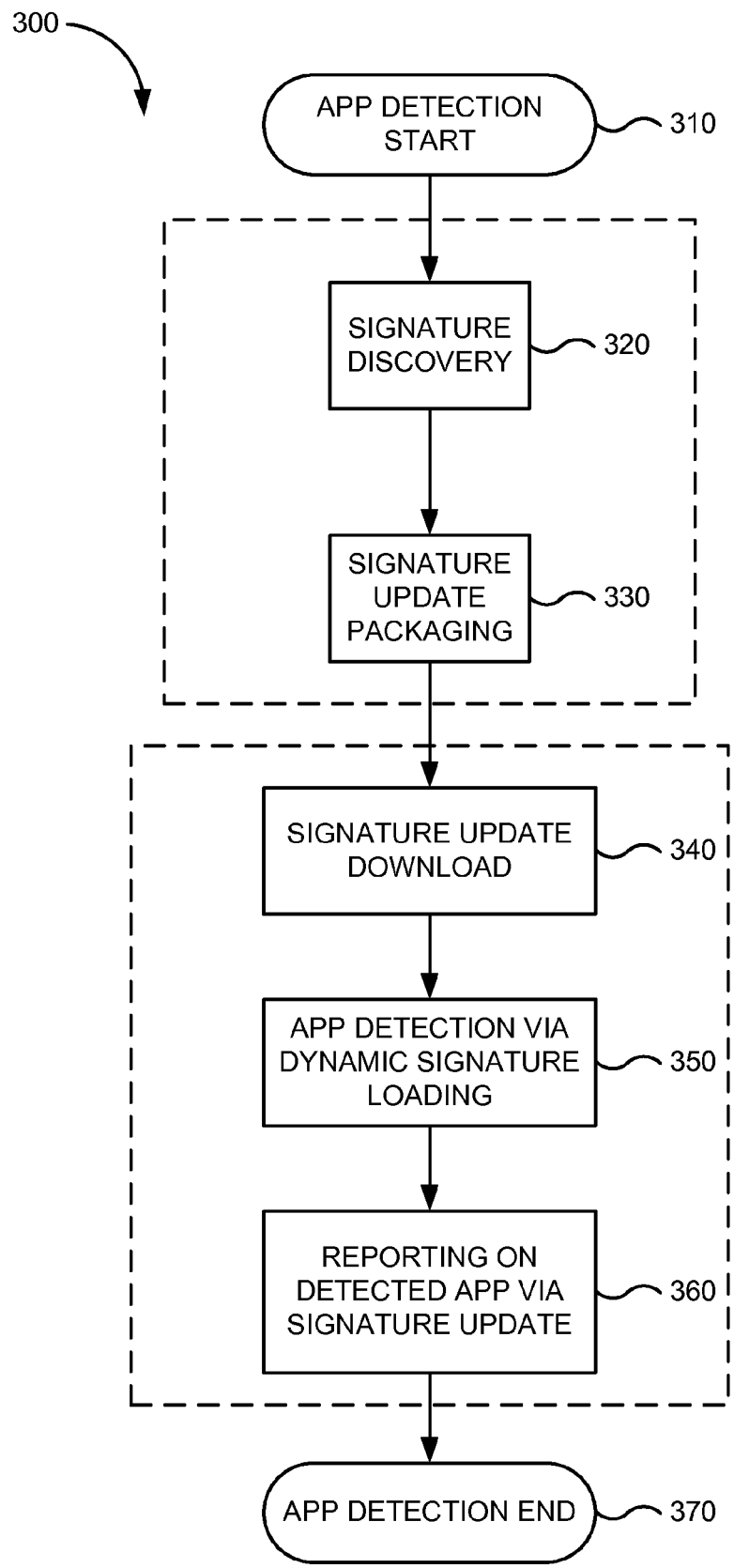
FIG. 3 is a flowchart of a method for identifying a given application from network traffic in one embodiment according to the present invention.

FIG. 3 is a simplified flowchart of method 300 for detecting and managing network-based applications using a data-driven model in one embodiment according to the present invention. The processing of method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, signature discovery is performed. Signature discovery can include one or more manual or automated processes in which information is collection about a network based application or its behavior. In various embodiments, a team of engineers and/or other network-based application investigators can collect information about network-based applications or their behavior and store the information in a database. The information collection about a network based application or its behavior may represent a signature. A signature can include one or more portions of information that identify an application from network traffic initiated or otherwise generated by the application, from its behavior, from where it was downloaded or developed, resources used or accessed, or the like. In some embodiments, an application signature may include a single data element or data point, such as a predetermined value found within a portion packet. In other embodiments, an application signature may include a plurality of data elements. In yet further embodiments, an application signature may include one or more data elements, or data structures having one or more values, that may be determined, interpreted, or calculated using logic or coding from network traffic. An application signature may be generated by a manual process or by a completely automated process from information retrieved from a database using a data model.

In step 330, signature update packaging is performed. For example, a set of one or more application signatures may be "packaged" into a downloadable file or distributable format. The packaging process may incorporate one or more application signatures, including any data structures or program logic, as well as other metadata, code, rule sets, registry information, access control lists, policies, security information, or other information updates. The packaging process may be cumulative (e.g., including all application signatures resulting from a predetermined discovery process) or may be incremental (e.g., including only those application signatures resulting after a predetermined time or event).

In step 340, a signature update is downloaded. For example, network traffic manager 120 may connect to server 160 or host 170 to download one or more filter updates. A filter update can include information made available according to the above packaging process. In other embodiments, a signature update may be distributed on physical media and installed or added to network traffic manager 120 using a manual process.

In step 350, application detection via dynamic signature loading is performed. In various embodiments, a main program of network traffic manager 120, when configured as an application detection device, may dynamically and/or automatically install, initialize, update, reinstall, uninstall, or the like, configurations for one or more inspection engines used in application detection. These configurations may include configurations for single inspection point engines, multiple inspection point, and custom inspection point engines.

Accordingly, with dynamic signature loading, network traffic manager 120 may be configured at any time with a list of unauthorized network-based applications for the purposes of detection, reporting, and interfacing with users of network traffic manager 120. In step 360, reporting on application detection via signature update is performed. As discussed above, network traffic manager 120 does not need a priori knowledge of all detectable applications. Applications that may be monitored by network traffic manager 120 can be enabled for detection via signature updates. The signature updates may further configure network traffic manager 120 for the purposes of reporting, logging, user interface updating, or the like. Method 300 depicted in FIG. 3 ends in step 370.

As discussed above, signature discovery can include one or more manual or automated processes in which information is collection about a network based application or its behavior. In various embodiments, a team of engineers and/or other network-based application investigators can collect information about network-based applications or their behavior and store the information in a database. The information collection about a network based application or its behavior may represent a signature.

Figure 4:
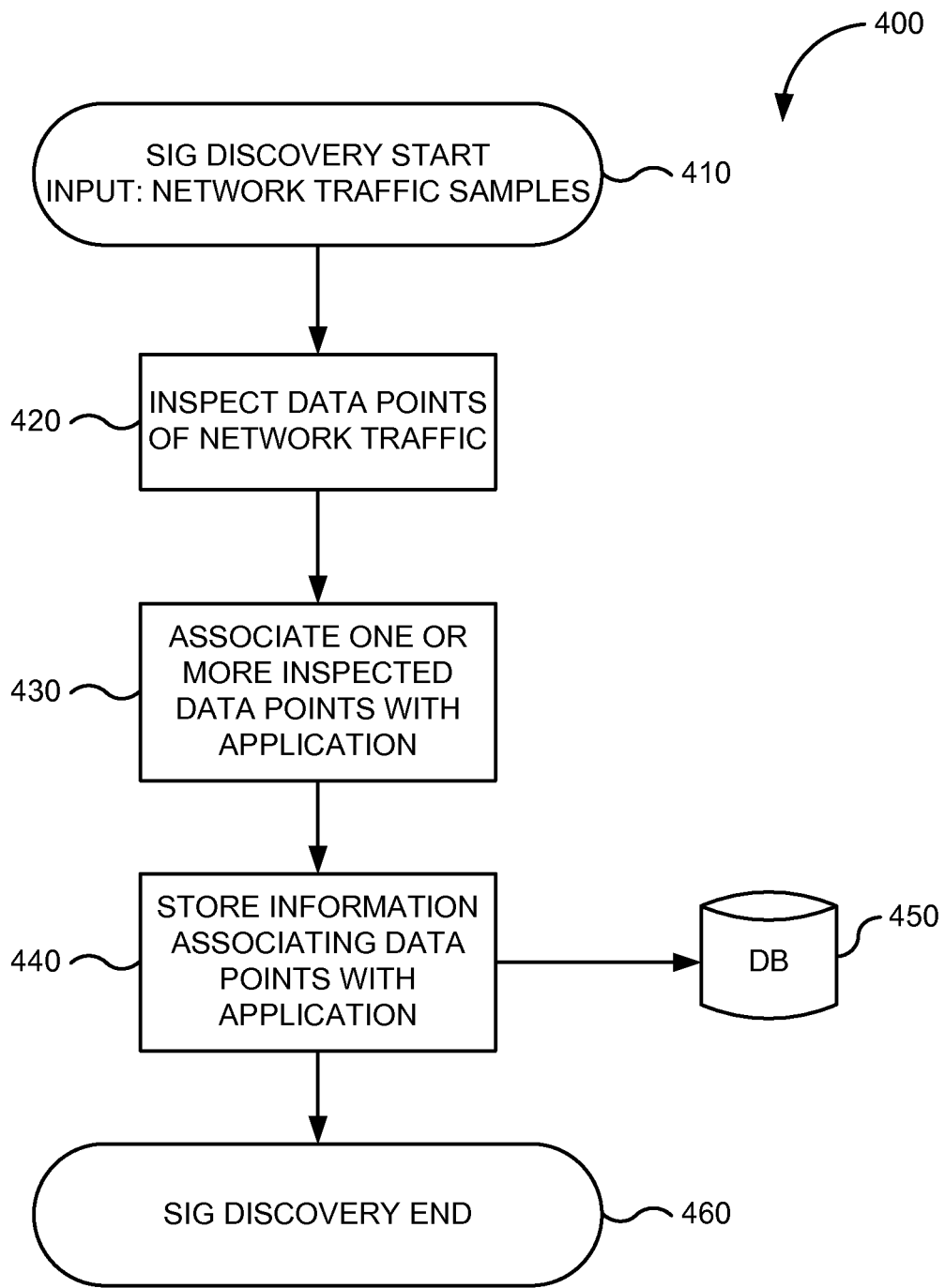
FIG. 4 is a flowchart of a method for generating rules for single inspection point dissection (SIP), multiple inspection point dissection (MIP), and custom dissector code in one embodiment according to the present invention.

FIG. 4 is a flowchart of method 400 for identifying a given application from network traffic in one embodiment according to the present invention. Method 400 depicted in FIG. 4 begins in step 410.

In step 420, one or more network traffic elements or data points are identified. For example, a given network-based application may be associated with an application-specific protocol. Therefore, network traffic generated by or otherwise originating from the network-based application may conform to a recognizable format (i.e., the application-specific protocol). One or more inspection or data points in network traffic may be established from particular bytes of a packet, predetermined fields within a header, source network addresses/ports, destination network addresses/ports, payload structure, payload contents, transmission control parameters, flow control information, state obtained from a sequence of packets, string matching, checksums, presences/absence of encryption, statistical models, behavioral models, or the like.

In step 430, one or more inspected or identified data points are associated with an application. The one or more inspected or identified data points network traffic may be associated with a single network-based application or with types/categories of network-based applications. In one example, network traffic destined for IP port 21 may usually be associated with file transfer protocol (FTP) applications. In another example, network traffic destined for a specific IP address that maps to a predetermined domain and/or hostname and that includes a specific URL may be associated with an HTTP-based application hosted by the predetermined domain. Accordingly, information collected directly from network traffic generated by a network-based application, indirectly about the applications operation, and the like, may be associated with an application.

In step 440, information associating the one or more identified data points with the application is stored. For example, the information may be stored in an application detection database 350. Application detection database 450 may include the data points, metadata associated with each data point, an application description, logic correlating one or more data points, or the like. Method 400 depicted in FIG. 4 ends in step 460.

In various embodiments, a service provide can use information stored in application detection database 450 to generate application signatures, rules, or program code used by network traffic manager 120 for detecting, identifying, and managing network-based applications. Confirmation information may be manually or automatically generated to dynamically and/or automatically install, initialize, update, reinstall, uninstall, or the like, configurations for one or more inspection engines used in application detection. These configurations may include configurations generated from application detection database 450 for single inspection point engines, multiple inspection point, and custom inspection point engines.

Figure 5:
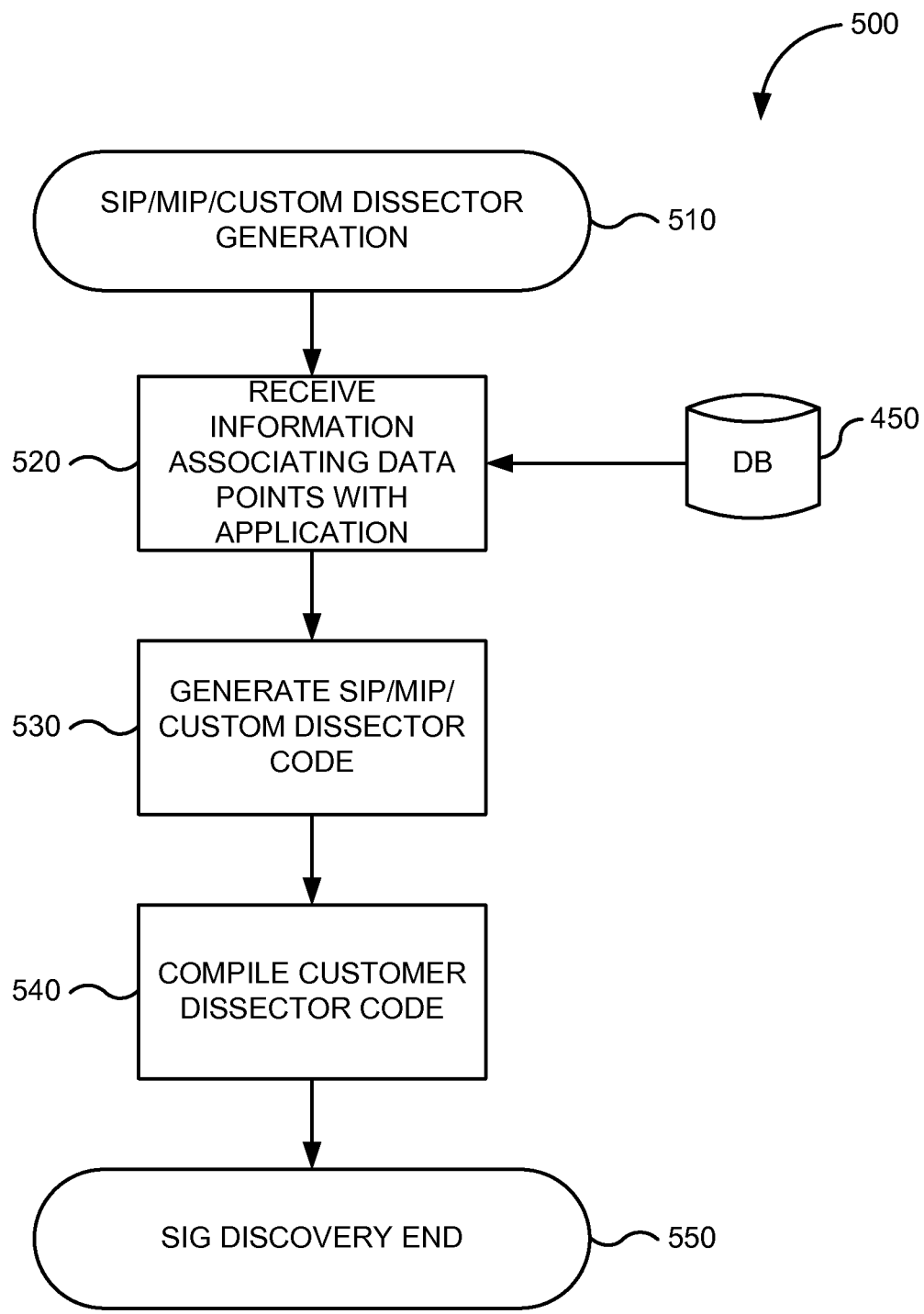
FIG. 5 is a flowchart of a method for packaging application signatures in one embodiment according to the present invention.

FIG. 5 is a flowchart of method 500 for generating rules for single inspection point dissection (SIP), multiple inspection point dissection (MIP), and custom dissector code in one embodiment according to the present invention. Method 500 depicted in FIG. 5 begins in step 510.

In step 520, information associating one or more data points with an application is received. For example, information obtained from application detection database 450 of FIG. 4 may include an application name, information describing how or where to determine the one or more data points in network traffic, logic for determining or calculating values from the one or more data points, or the like.

In step 530, one or more rules or rule sets for a single inspection point (SIP) engine or a multiple inspection point (MIP) engine are generated or custom dissector code is generated based on the information. A rule may indicated a set of inputs or conditions and a set of outputs for when the inputs or conditions are met, matched, or otherwise satisfied. In one example, a rule is executed or otherwise applied by a given inspection engine or inspector which includes information specifying which data point the given inspection engine or inspector needs to inspect (e.g., what byte or set of bytes of a packet are to be looked at) and information indicative of a predetermined value or expected result that when matched with the data point causes the rule to be satisfied or otherwise generated an match condition or indication.

In various embodiments, custom dissector code may include data structure and/or logic represented by software code that can be compiled into a custom dissector. The custom dissector may be dynamically loaded or invoked from a rule executed by a SIP or MIP engine for a variety or reasons. For example, a given rule may produce a certain number of false positives or false negatives under certain conditions. Those certain conditions may be covered by a custom dissector that reevaluates the application detection indication provided by the SIP/MIP engine. In other embodiments, a custom dissector may be directed to an application-specific protocol whose complexity may not readily be established by data point specific inspection engines.

In step 540, code representing any custom dissectors may be compiled for execution. In some embodiments, the code may be complied into native code. In other embodiments, the code may be complied into byte code for an interpreted language. Method 500 depicted in FIG. 5 ends in step 550.

Figure 6:
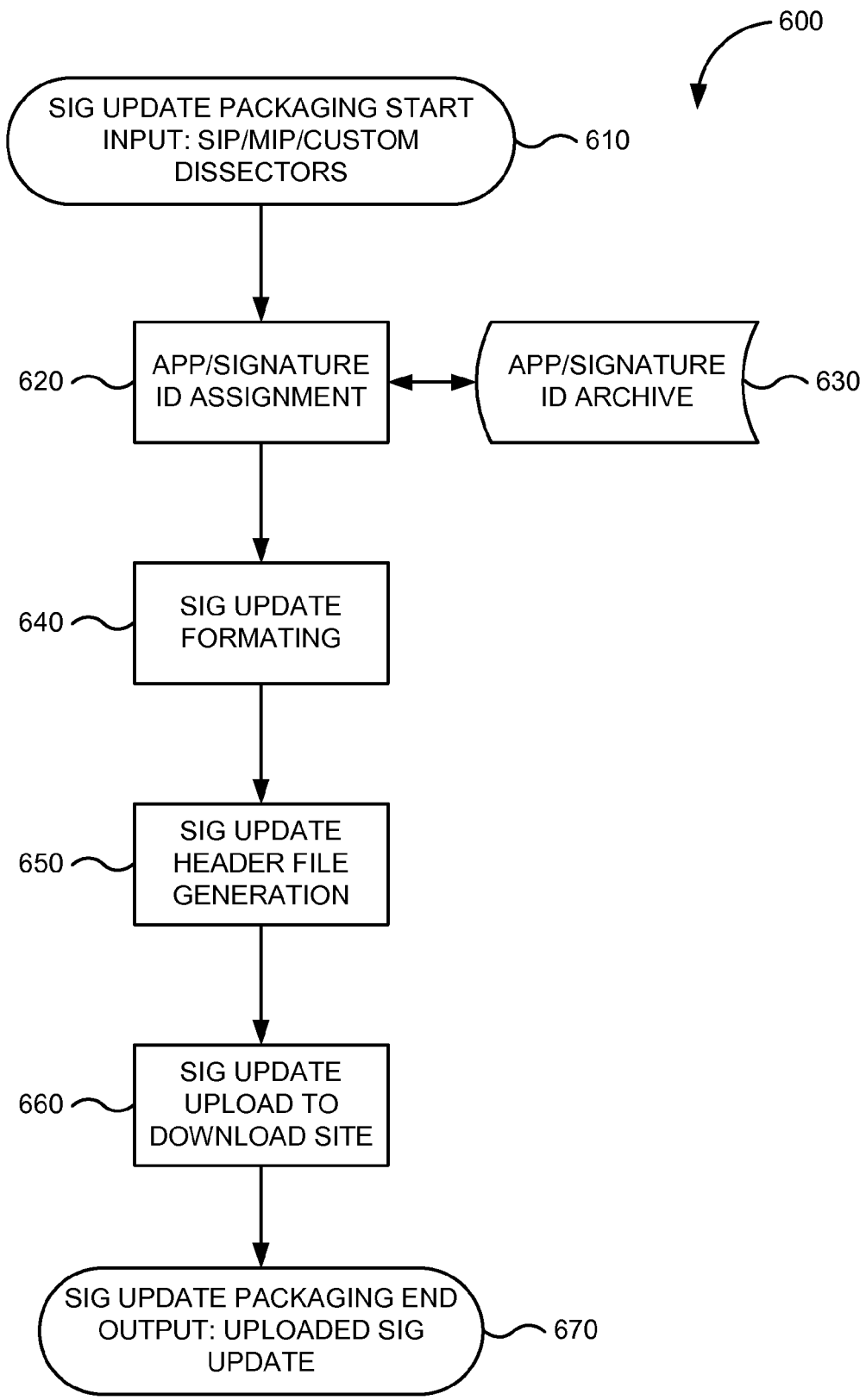
FIG. 6 is a block diagram of an embodiment of a network traffic manager in one embodiment according to the present invention.

FIG. 6 is a flowchart of method 600 for packaging application signatures in one embodiment according to the present invention. Method 600 depicted in FIG. 6 begins in step 610, where, one or more rules for a single inspection point (SIP) engine or a multiple inspection point (MIP) engine are received and/or custom dissector code is received.

In step 630, application/signature ID assignment is performed. ID assignment may be performed using an application/signature archive where IDs for previously packaged signatures for applications may be retrieved and new IDs may be assigned. In step 640, signature updated formatting is performed. In step 650, signature header file generation is performed. In step 660, the packaged signature update is uploaded to a download site, such as a website, FTP site, bittorrent site, or the like. The signature update is then available for download to one or more application detection devices, such as network traffic manager 120 of FIG. 1. Method 600 depicted in FIG. 6 ends in step 670.

Figure 7:
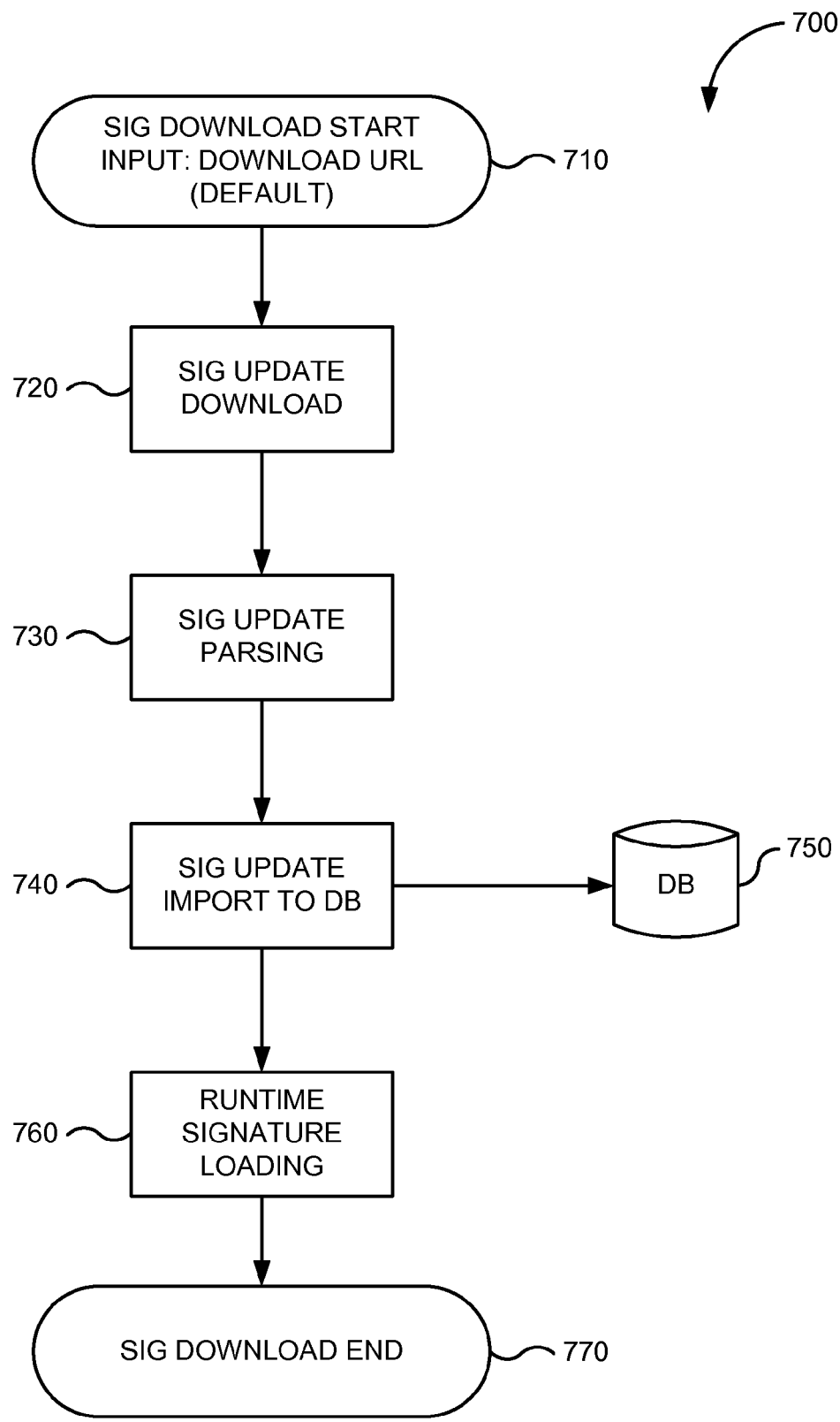
FIG. 7 is a flowchart of a method for updating detectable applications in one embodiment according to the present invention.

FIG. 7 is a flowchart of method 700 for updating detectable applications in one embodiment according to the present invention. Method 700 depicted in FIG. 7 begins in step 710. For example, a download URL may be provided to network traffic manager 120.

In step 720, a signature update is downloaded. As discussed above, the signature update may include rules, custom dissectors, or other information for configuring and operating application detection using SIP engine 240, MIP engine 245, and Custom Dissector 250. In step 730, signature update parsing is performed.

In step 740, the signature update is imported in an application detection database 750. In step 770, any necessary application signatures (e.g., rules and/or dynamically loadable custom dissectors) are loaded at or during run time. Method 700 depicted in FIG. 7 ends in step 780.

Figure 8:
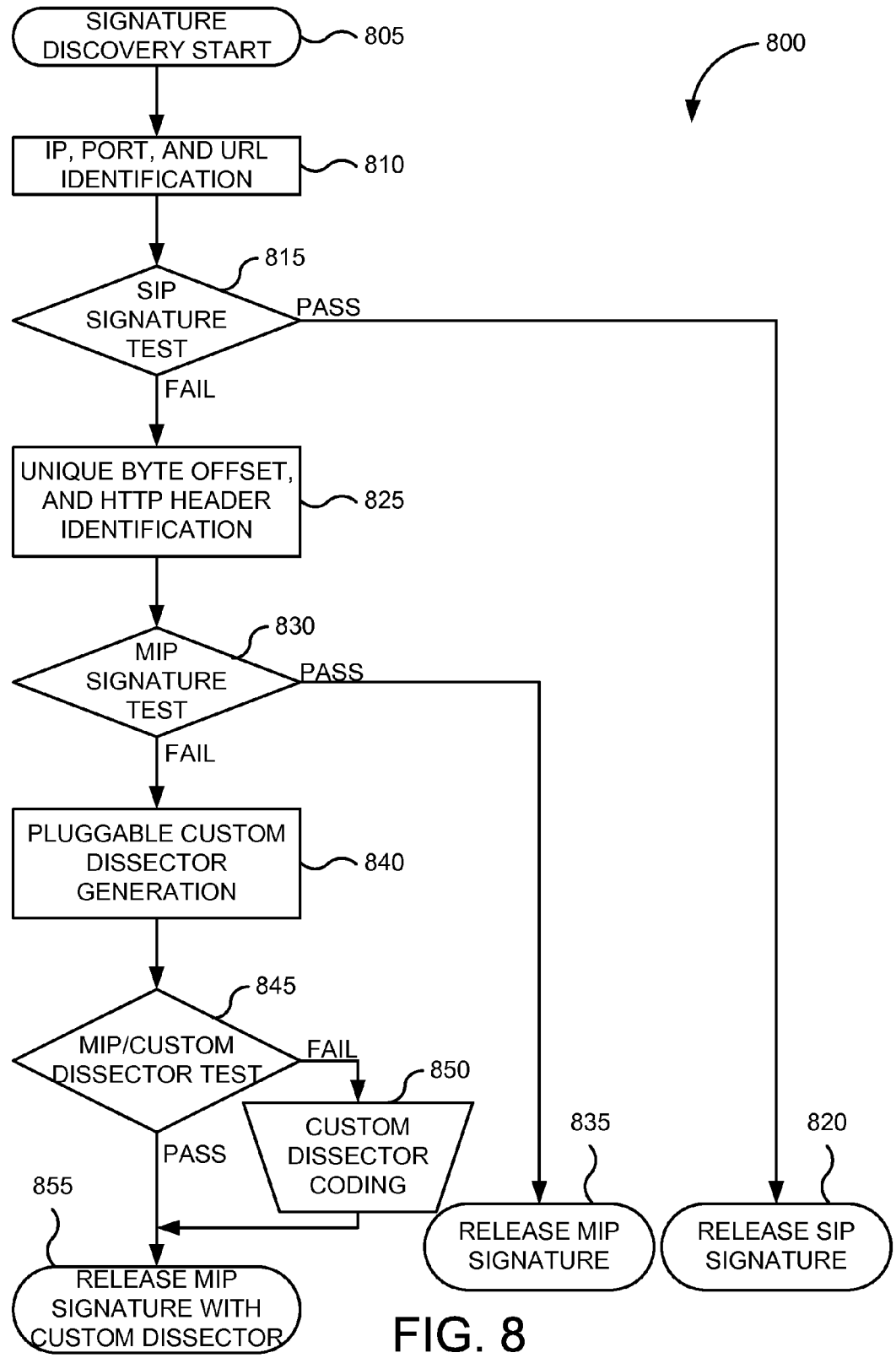
FIG. 8 is a flowchart of a method for detecting applications from network traffic in one embodiment according to the present invention.

FIG. 8 is a flowchart of method 800 for detecting applications from network traffic in one embodiment according to the present invention. Method 800 depicted in FIG. 8 begins in step 805.

In step 810, network traffic (e.g., one or more packets) is parsed. For example, identification can be made of various individual data points, such as source IP address, source port, destination IP address, destination port, protocol type, URL, hostname, domain name, or the like. In step 815, SIP signature testing is performed. If SIP signature testing provides a pass result in step 815, then in step 820, the SIP signature is released providing an indication of a detected application.

If SIP signature testing provides a fail result in step 815, in step 825, the network traffic may be further parsed. For example, identification may be made of a combination of data points, such as strings, unique byte offsets, HTTP header information, or the like. In step 830, MIP signature testing is performed. If MIP signature testing provides a pass result in step 830, in step 835, the MIP signature is released providing an indication of a detected application.

If MIP signature testing provides a fail result in step 830, in step 840, pluggable custom dissector generation is performed. In step 845, MIP/Custom Dissector testing is performed. If MIP/Custom Dissector testing provides a fail result in step 845, in step 850, further evaluation is performed using custom dissector code. In step 855, the MIP/Custom Dissector signature is released if pass result is provided in step 845 or based on the custom dissector code in step 850.

In various embodiments, method 800 depicted in FIG. 8 may be performed by an application detection engine. For example, the application detection engine may employ each of a plurality of detectors that, in a first tier of analysis, inspect one data point for the purposes of detecting an application. Based on pass/fail results by individual detectors, the application detection engine may employ a plurality of detectors that, in a second tier of analysis, inspect multiple data points for the purposes of detecting applications. Based on pass/fail results by individual detectors, the application detection engine may employ one or more custom dissectors that, in a third tier of analysis, cover false positive/false negative scenarios or other application-specific protocols. Whether an inspection engine or detector operates as a SIP, MIP, or custom detector may change, as may the order in which an engine or detector can be invoked.

In further embodiments, method 800 depicted in FIG. 8 may be performed independently by each of a plurality of inspection engines or detectors. For example, an individual detection engine may, in a first tier of analysis, inspect one data point for the purposes of detecting an application. Based on pass/fail results, the detection engine may, in a second tier of analysis, inspect multiple data points for the purposes of detecting applications. Based on pass/fail results, the individual detectors may invoke or employ one or more custom dissectors that, in a third tier of analysis, cover false positive/false negative scenarios or other application-specific protocols.

Figure 9:
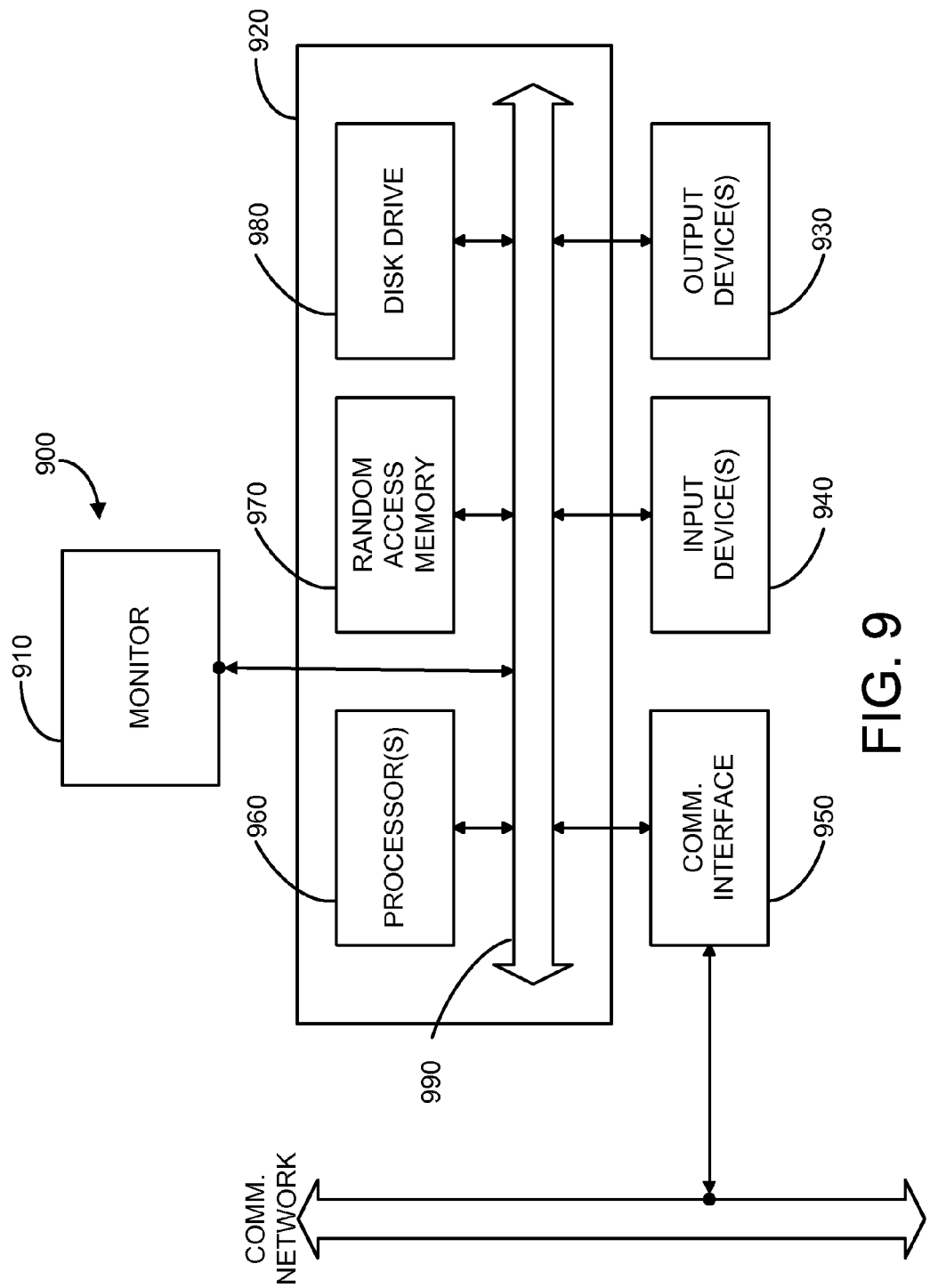
FIG. 9 is a simplified block diagram of a computer system that may incorporate embodiments of the present invention.

FIG. 9 is a simplified block diagram of computer system 900 that may incorporate embodiments of the present invention. FIG. 9 is merely illustrative of an embodiment incorporating the present invention and does not limit the scope of the invention as recited in the claims. One of ordinary skill in the art would recognize other variations, modifications, and alternatives.

In one embodiment, computer system 900 typically includes a monitor 910, a computer 920, user output devices 930, user input devices 940, communications interface 950, and the like.

As shown in FIG. 9, computer 920 may include a processor(s) 960 that communicates with a number of peripheral devices via a bus subsystem 990. These peripheral devices may include user output devices 930, user input devices 940, communications interface 950, and a storage subsystem, such as random access memory (RAM) 970 and disk drive 980.

User input devices 930 include all possible types of devices and mechanisms for inputting information to computer system 920. These may include a keyboard, a keypad, a touch screen incorporated into the display, audio input devices such as voice recognition systems, microphones, and other types of input devices. In various embodiments, user input devices 930 are typically embodied as a computer mouse, a trackball, a track pad, a joystick, wireless remote, drawing tablet, voice command system, eye tracking system, and the like. User input devices 930 typically allow a user to select objects, icons, text and the like that appear on the monitor 910 via a command such as a click of a button or the like.

User output devices 940 include all possible types of devices and mechanisms for outputting information from computer 920. These may include a display (e.g., monitor 910), non-visual displays such as audio output devices, etc.

Communications interface 950 provides an interface to other communication networks and devices. Communications interface 950 may serve as an interface for receiving data from and transmitting data to other systems. Embodiments of communications interface 950 typically include an Ethernet card, a modem (telephone, satellite, cable, ISDN), (asynchronous) digital subscriber line (DSL) unit, FireWire interface, USB interface, and the like. For example, communications interface 950 may be coupled to a computer network, to a FireWire bus, or the like. In other embodiments, communications interfaces 950 may be physically integrated on the motherboard of computer 920, and may be a software program, such as soft DSL, or the like.

In various embodiments, computer system 900 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 920 includes one or more Xeon microprocessors from Intel as processor(s) 960. Further, one embodiment, computer 920 includes a UNIX-based operating system.

RAM 970 and disk drive 980 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 970 and disk drive 980 may be configured to store the basic programming and data constructs that provide the functionality of the present invention.

Software code modules and instructions that provide the functionality of the present invention may be stored in RAM 970 and disk drive 980. These software modules may be executed by processor(s) 960. RAM 970 and disk drive 980 may also provide a repository for storing data used in accordance with the present invention.

RAM 970 and disk drive 980 may include a number of memories including a main random access memory (RAM) for storage of instructions and data during program execution and a read only memory (ROM) in which fixed instructions are stored. RAM 970 and disk drive 980 may include a file storage subsystem providing persistent (non-volatile) storage for program and data files. RAM 970 and disk drive 980 may also include removable storage systems, such as removable flash memory.

Bus subsystem 990 provides a mechanism for letting the various components and subsystems of computer 920 communicate with each other as intended. Although bus subsystem 990 is shown schematically as a single bus, alternative embodiments of the bus subsystem may utilize multiple busses.

FIG. 9 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A non-transitory computer-readable storage medium storing code executable by one or more processors of one or more of a plurality of computer systems for detecting network-based applications, the non-transitory computer-readable storage medium comprising:
   code for receiving at a first set of one or more computer systems in the plurality of computer systems information describing one or more data points, the one or more data points identified in response to an analysis of network traffic sent to or received from a network application to identify a set of data points associated with the network traffic that are characteristic of the network-based application;
   code for associating with the first set of one or more computer systems in the plurality of computer systems the information describing the identified one or more data points with the network-based application;
   code for storing with the first set of one or more computer systems in the plurality of computer systems information about the network-based application, the information describing the identified one or more data points, and information associating the information describing the identified one or more data points and the network-based application in a database;
   code for generating with a second set of one or more computer systems in the plurality of computer systems a set of rules in response to accessing the database that configure an application detection engine to identify the network-based application from network traffic, each rule in the set of rules specifying at least one of the one or more identified data points and one or more conditions when data in the network traffic associated with the at least one of the one or more identified data points satisfies the rule; and
   code for communicating from one or more computer systems in the plurality of computer systems the set of rules to an application detection device, wherein at least application detection functionality of the application detection device is dynamically updated to support detection of the network-based application based on the communicated set of rules.

2. The non-transitory computer-readable storage medium of claim 1 wherein the code for receiving the one or more data points comprises code for receiving one or more of a source address, a destination address, a source port, a destination port, one or more header fields, payload data, or combinations thereof.

3. The non-transitory computer-readable storage medium of claim 1 further comprising:
   code for receiving one or more of a filename, a download location, a URL, a hostname, or a domain name associated with the network-based application; and
   code for storing information associating the one or more of a filename, a download location, a URL, a hostname, or a domain name associated with the network-based application with the network-based application in the database.

4. The non-transitory computer-readable storage medium of claim 1 further comprising:
   code for packaging the set of rules into a format appropriate for the application detection device.

5. The non-transitory computer-readable storage medium of claim 1 further comprising:
   code for receiving information describing logic for determining information using one or more of the identified one or more data points;
   code for associating the logic with the network-based application; and
   code for storing the logic and information associating the logic and the network-based application in the database.

6. The non-transitory computer-readable storage medium of claim 5 further comprising:
   code for generating program code based on the logic; and
   code for compiling the program code for execution at the application detection device.

7. The non-transitory computer-readable storage medium of claim 6 wherein the code for compiling the program code for execution at the application detection device comprises code for compiling the program code for dynamic loading at the application detection device.

8. The non-transitory computer-readable storage medium of claim 6 wherein the code for communicating the set of rules to the application detection device further comprise code for communicating the compiled program code, wherein at least the application detection functionality of the application detection device is dynamically updated to support detection of the network-based application based on the communicated set of rules and the compiled program code.

9. The non-transitory computer-readable storage medium of claim 5 wherein the code for receiving the information describing the logic comprises code for receiving logic for maintaining stating information across the network traffic.

10. The non-transitory computer-readable storage medium of claim 5 wherein the code for receiving the information describing the logic comprises code for receiving logic for determining one or more hash values or checksum from the network traffic.

11. The method of claim 1 wherein the dynamic updated of at least the application detection functionality of the application detection device to support detection of the network-based application based on the communicated set of rules comprises updated during run-time.

12. The method of claim 1 wherein at least one or more user interfaces of the application detection device are dynamically updated to support displaying of information associated with the network-based application based on the communicated set of rules.

13. The method of claim 1 wherein at least reporting functionality of the application detection device is dynamically updated to support reporting of information associated with the network-based application based on the communicated set of rules.

14. A non-transitory computer-readable storage medium storing code executable by one or more processors of one or more of a plurality of computer systems for detecting network-based applications, the non-transitory computer-readable storage medium comprising:
  code for receiving at a first set it one or more computer systems in the plurality of computer systems information describing one or more data points, the one or more data points identified in response to an analysis of network traffic sent to or received from a network application to identify a set of data points associated with the network traffic that are characteristic of the network-based application;
  code for associating with the first set of one or more computer systems in the plurality of computer systems the information describing the identified one or more data points with the network-based application;
  code for storing with the first set of one or more computer systems in the plurality of computer systems information about the network-based application, the information describing the identified one or more data points, and information associating the information describing the identified one or more data points and the network-based application in a database;
  code for generating with a second set of one or more computer systems in the plurality of computer systems a set of rules in response to accessing the database that configure an application detection engine to identify the network-based application from network traffic, each rule in the set of rules specifying at least one of the one or more identified data points and one or more conditions when data in the network traffic associated with the at least one of the one or more identified data points satisfies the rule; and
  code for communicating from one or more computer systems in the plurality of computer systems the set of rules to an application detection device, wherein at least application detection functionality of the application detection device is dynamically updated to support detection of the network-based application based on the communicated set of rules.

15. The non-transitory computer-readable storage medium of claim 14 wherein the code for receiving the one or more data points comprises code for receiving one or more of a source address, a destination address, a source port, a destination port, one or more header fields, payload data, or combinations thereof.

16. The non-transitory computer-readable storage medium of claim 14 further comprising:
  code for receiving one or more of a filename, a download location, a URL, a hostname, or a domain name associated with the network-based application; and
  code for storing information associating the one or more of a filename, a download location, a URL, a hostname, or a domain name associated with the network-based application with the network-based application in the database.

17. The non-transitory computer-readable storage medium of claim 14 further comprising:
  code for packaging the set of rules into a format appropriate for the application detection device.

18. The non-transitory computer-readable storage medium of claim 14 further comprising:
  code for receiving information describing logic for determining information using one or more of the identified one or more data points;
  code for associating the logic with the network-based application; and
  code for storing the logic and information associating the logic and the network-based application in the database.

19. The non-transitory computer-readable storage medium of claim 18 further comprising:
  code for generating program code based on the logic; and
  code for compiling the program code for execution at the application detection device.

20. The non-transitory computer-readable storage medium of claim 19 wherein the code for compiling the program code for execution at the application detection device comprises code for compiling the program code for dynamic loading at the application detection device.

21. The non-transitory computer-readable storage medium of claim 19 wherein the code for communicating the set of rules to the application detection device further comprise code for communicating the compiled program code, wherein at least the application detection functionality of the application detection device is dynamically updated to support detection of the network-based application based on the communicated set of rules and the compiled program code.

22. The non-transitory computer-readable storage medium of claim 18 wherein the code for receiving the information describing the logic comprises code for receiving logic for maintaining stating information across the network traffic.

23. The non-transitory computer-readable storage medium of claim 18 wherein the code for receiving the information describing the logic comprises code for receiving logic for determining one or more hash values or checksum from the network traffic.

24. A system for detecting network-based applications, the system comprising:
  a database configured to store information about a network-based application;
  a first set of one or more computer systems configured to:
    receive information describing the one or more data points, the one or more data points determined in response to an analysis of network traffic sent to or received from the network application to identify a set of data points associated with the network traffic that are characteristic of the network-based application,
    associate the information describing the identified one or more data points with the network-based application, and
    store the information about the network-based application, the information describing the identified one or more data points, and information associating the information describing the identified one or more data points and the network-based application in the database; and a second set of one or more computer systems configured to:
  generate a set of rules in response to accessing the database that configure an application detection engine to identify the network-based application from network traffic, each rule in the set of rules specifying at least one of the one or more identified data points and one or more conditions when data in the network traffic associated with the at least one of the one or more identified data points satisfies the rule, and
  communicate the set of rules to an application detection device, wherein at least application detection functionality of the application detection device is dynamically updated to support detection of the network-based application based on the communicated set of rules.

* * * * *